United States Patent [19]
Ikeda et al.

[11] Patent Number: 6,126,230
[45] Date of Patent: Oct. 3, 2000

[54] ENERGY ABSORBING STRUCTURE FOR AUTOMOBILE

[75] Inventors: Koki Ikeda; Toshiya Miyashita, both of Toyota, Japan

[73] Assignee: Toyota Jidosha Kabushiki Kaisha, Toyota, Japan

[21] Appl. No.: 08/998,284

[22] Filed: Dec. 24, 1997

[30] Foreign Application Priority Data

Dec. 24, 1996 [JP] Japan .................................. 8-355457

[51] Int. Cl.⁷ .................................................. B60R 11/00
[52] U.S. Cl. .......................... 296/189; 296/214; 296/210
[58] Field of Search .................................. 296/188, 189, 296/210, 214

[56] References Cited

U.S. PATENT DOCUMENTS

| | | |
|---|---|---|
| 2,939,741 | 6/1960 | Keating . |
| 5,169,204 | 12/1992 | Kelman .................................. 296/189 |
| 5,519,917 | 5/1996 | Cordonnier ............................. 296/214 |
| 5,529,344 | 6/1996 | Yasui . |
| 5,544,928 | 8/1996 | Mori . |
| 5,662,375 | 9/1997 | Adams et al. .......................... 296/214 |
| 5,741,044 | 4/1998 | Kawai et al. ........................... 296/214 |
| 5,855,408 | 1/1999 | Rickabus ................................ 296/214 |
| 5,920,957 | 7/1999 | Wagner .................................. 296/214 |
| 6,042,176 | 3/2000 | Ikeda et al. ............................ 296/189 |

FOREIGN PATENT DOCUMENTS

| | | |
|---|---|---|
| 7-61304 | 3/1995 | Japan . |
| 7-96790 | 4/1995 | Japan . |
| 7-172169 | 7/1995 | Japan . |
| 7-172265 | 7/1995 | Japan . |
| 7-232583 | 9/1995 | Japan . |
| 7-329623 | 12/1995 | Japan . |
| 8-20274 | 1/1996 | Japan . |
| 8-113162 | 5/1996 | Japan . |
| 9-277864 | 10/1997 | Japan . |

OTHER PUBLICATIONS

JAMA, "Examples of Automobile Technics", No. 95016, Feb. 10, 1995.
Toyota Technical Publication, No. 5161, Sep. 30, 1994.
Patent Abstract of Japan; JP 08113162, vol. 096, No. 009, Sep. 1996.
Patent Abstract of Japan; JP 07304419, vol. 096, No. 003, Mar. 29, 1996.
Patent Abstract of Japan; JP 07290949, vol. 096, No. 003, Mar. 29, 1996.
Patent Abstract of Japan; JP 07061304, vol. 095, No. 006, Jul. 31, 1995.

*Primary Examiner*—Gary C. Hoge
*Attorney, Agent, or Firm*—Pillsbury Madison & Sutro LLP

[57] ABSTRACT

An energy absorbing structure for an automobile comprises a metal bracket interposed between a roofside rail and an assist grip. The bracket has longitudinal end portions fixed to the roofside rail on the compartment side, and a deformable portion extending between the end portions, to which the assist grip is connected. The deformable portion deforms toward the outside of the compartment to provide energy absorption when an outward load larger than a predetermined load acts on the assist grip. A pair of reinforcing members are formed integrally with the deformable portion which extends along the longitudinal axis of the bracket.

20 Claims, 9 Drawing Sheets

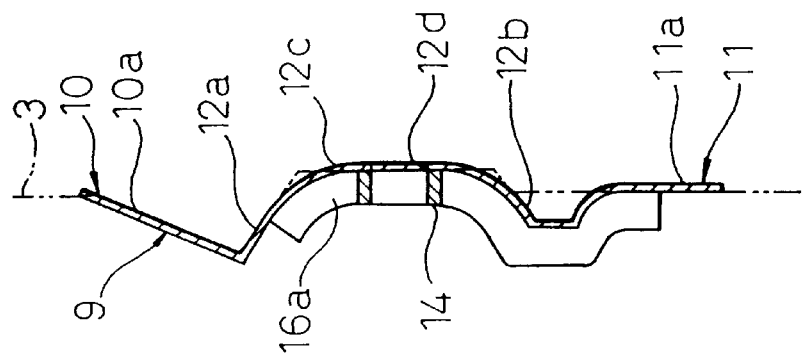
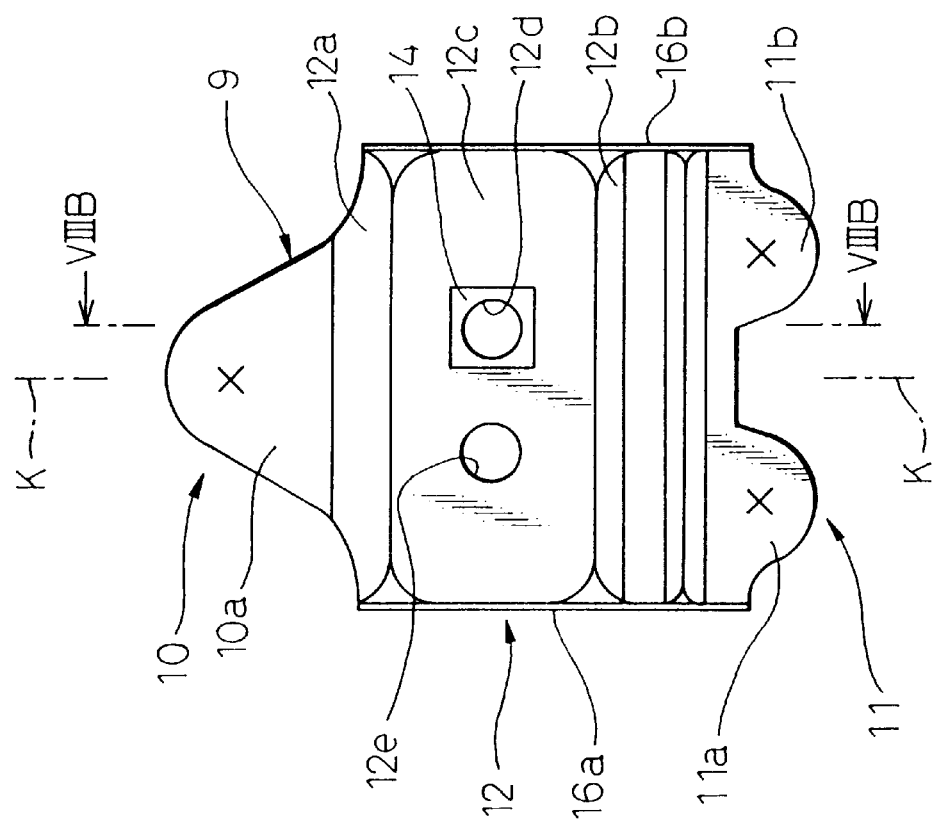

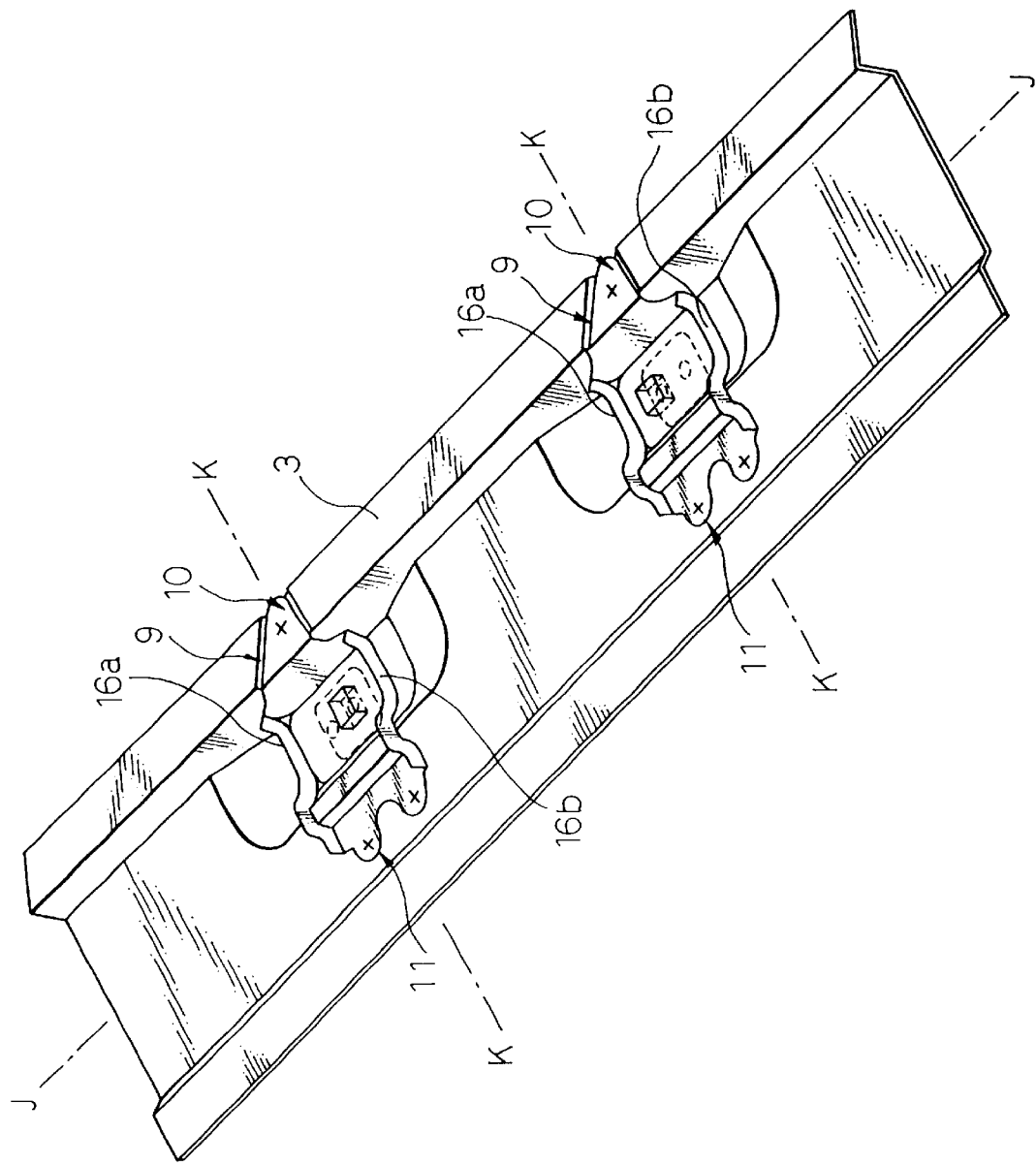

ENERGY ABSORBING STRUCTURE FOR AUTOMOBILE

BACKGROUND OF THE INVENTION

1. Field of the Invention

The present invention relates to an energy absorbing structure for an automobile.

2. Description of the Related Art

Energy absorption at an assist grip of an automobile has been required. However, a roofside rail, to which the assist grip is connected, typically has a high rigidity, and thus a special structure is needed for the energy absorbing structure.

Japanese Unexamined Patent Publication No. 7-232583 discloses an assist grip supporting structure for an automobile, in which the roofside rail includes a deformable portion to which the assist grip is connected, and the deformable portion deforms when a large outward load acts on the assist grip, to thereby provide energy absorption.

Note that "outward" refers to a direction from the compartment toward the outside and "inward" refers to a direction from the outside toward the compartment, in this specification.

Further, Japanese Unexamined Patent Publication No. 7-61304 discloses an assist grip supporting structure for an automobile in which the assist grip includes a deformable portion, and the deformable portion deforms when a large outward load acts on the assist grip, to thereby provide the energy absorption.

However, the assist grip supporting structure disclosed in the former publication may decrease the rigidity of the roofside rail, and that in the latter publication may decrease the strength of the assist grip.

On the other hand, U.S. Pat. No. 5,529,344 discloses a seat belt anchor supporting structure for an automobile in which a bracket having a deformable portion is connected to a center pillar of the automobile, and the seat belt anchor is supported by the bracket. The deformable portion deforms when a large outward load acts on the seat belt anchor, to thereby provide the energy absorption.

Therefore, it may be considered that there is provided an assist grip supporting structure which can provide energy absorption if the assist grip is applied to the seat belt anchor supporting structure, i.e., if the bracket having a deformable portion is connected to the roofside rail and the assist grip is connected to the deformable portion.

Because the deformable portion of the bracket mentioned above must deform due to an outward load on the assist grip, the deformable portion may also deform due to an inward load on the assist grip. However, the large inward load may act on the assist grip in the normal use. If the deformable portion deforms inwardly, the assist grip is not supported firmly.

SUMMARY OF THE INVENTION

An object of the present invention is to provide an energy absorbing structure of an automobile capable of supporting the assist grip firmly, while providing energy absorption for an outward load on the assist grip.

According to the present invention, there is provided an energy absorbing structure for an automobile having a passenger compartment, a roofside rail with a closed section and an inner space, the roofside rail having a side facing the compartment, and an assist grip connected to the compartment side of the roofside rail, the energy absorbing structure comprising: a bracket interposed between the roofside rail and the assist grip, the bracket having longitudinal end portions fixed to the roofside rail, and a deformable portion extending between the end portions, to which the assist grip is connected, the deformable portion deforming toward the outside of the compartment to provide energy absorption when an outward load larger than a predetermined load acts on the assist grip; and at least one reinforcing member formed integrally with the deformable portion of the bracket and extending along the longitudinal axis of the bracket.

The present invention may be more fully understood from the description of the preferred embodiments of the invention as set forth below, together with the accompanying drawings.

BRIEF DESCRIPTION OF THE DRAWINGS

FIG. 8A is a front view of the bracket shown in FIG. 7;

FIG. 8B is a cross sectional view of the bracket along the line VIIIB—VIIIB shown in FIG. 8A;

FIG. 9 is a perspective view illustrating the bracket connected to the inner panel, according to the embodiment shown in FIG. 7.

DESCRIPTION OF THE PREFERRED EMBODIMENTS

Figure 1:
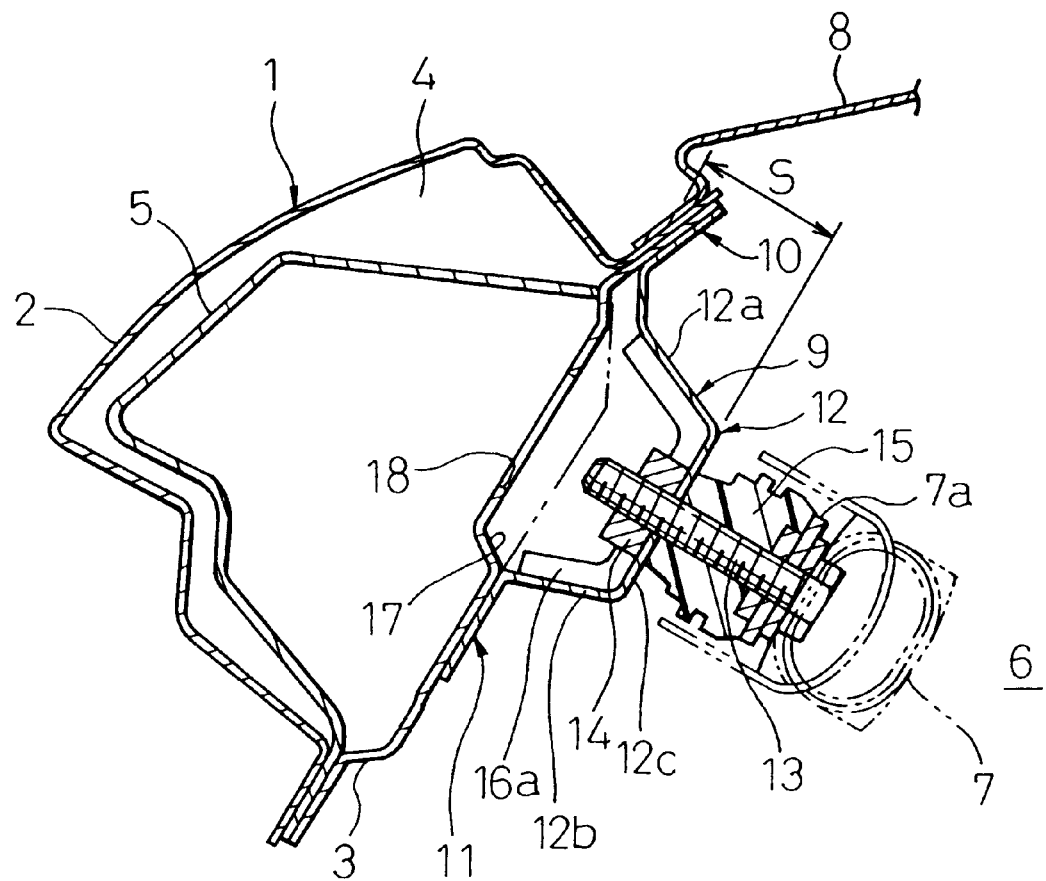
FIG. 1 is a vertical cross sectional view of a roofside rail with an assist grip and a bracket.

Referring to FIG. 1, an automobile comprises a roofside rail 1 extending along the longitudinal axis of the automobile. The roofside rail 1 comprises an outer panel 2 and an inner panel 3 connected to each other, by spot welding, to define a closed section and an inner space 4 of the roofside rail 1. A reinforcing panel 5 for enhancing the rigidity of the roofside rail 1 is arranged in the inner space 4 and supported by the outer and inner panels 2 and 3. The inner panel 3 is arranged in a passenger compartment 6 of the automobile. An assist grip 7 arranged in the compartment 6 is connected to the inner panel 3. Further, a roof panel 8 is connected to the roofside rail 1. Thus, the roofside rail 1 and the assist grip 7 are positioned on the upper portion of the compartment 6.

The outer, the inner, and the reinforcing panels 2, 3, and 5 are formed of a metal such as steel. The outer panel 2 has a thickness of 0.6 to 1.2 mm, the inner panel 3 has a thickness of 0.7 to 1.4 mm, and the reinforcing panel 5 has a thickness of 1.2 to 1.6 mm.

A bracket 9, formed of a metal plate such as steel or aluminum plate, is interposed between the inner panel 3 and assist grip 7. The bracket 9 is connected to the inner panel 3 on the compartment side, i.e., outside of the inner space 4.

Figure 2:
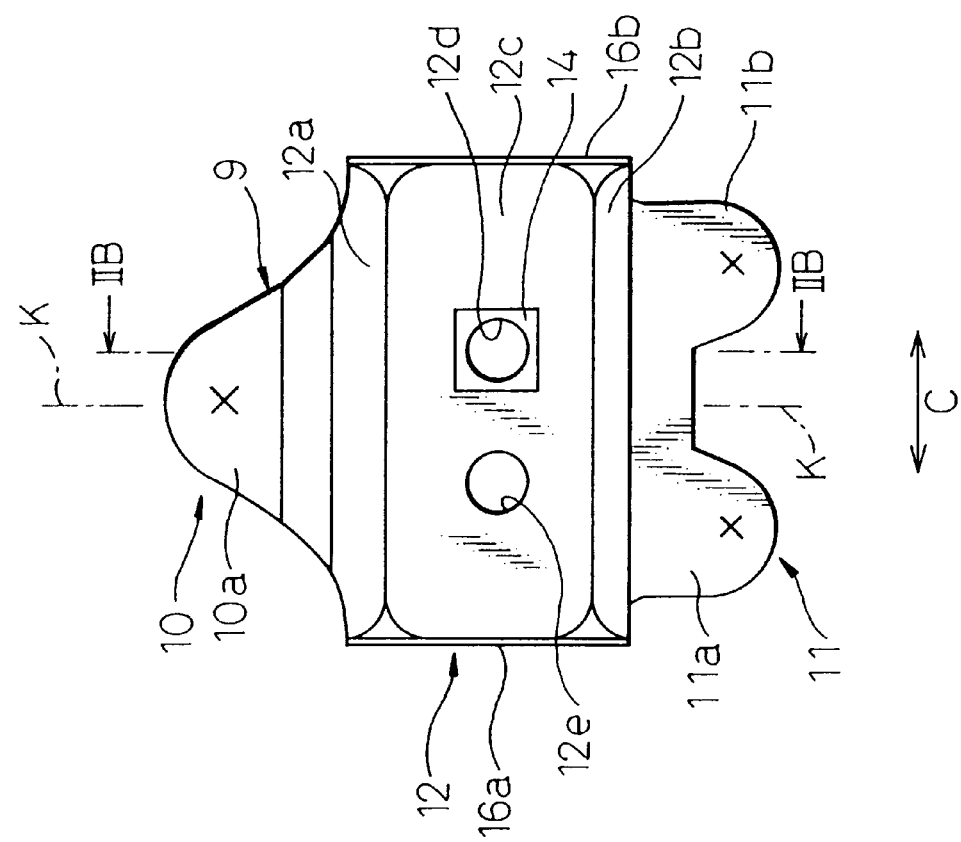
FIG. 2A is a front view of the bracket.
FIG. 2B is a cross sectional view of the bracket along the line IIB—IIB shown in FIG. 2A.
Figure 3:
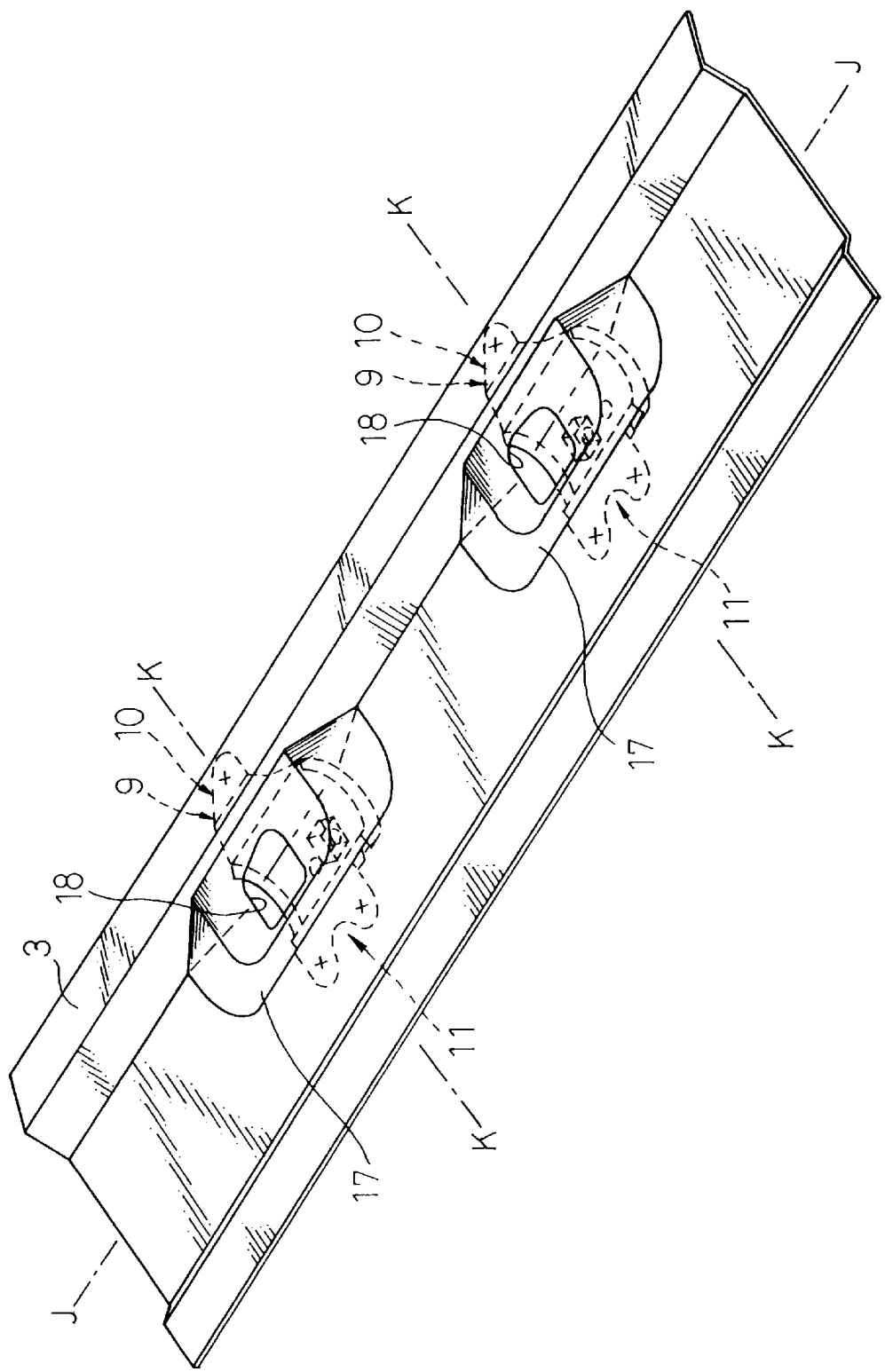
FIG. 3 is a perspective view illustrating the bracket connected to an inner panel.

As shown in FIGS. 1, 2A, and 2B, the bracket 9 comprises opposed, longitudinal end portions 10 and 11, and a deformable portion 12 extending between the end portions 10 and 11. The upper end portion 10 includes a single tab 10a, and the lower end portion 11 includes two tabs 11a and 11b. The tabs 10a, 11a, and 11b are connected to the inner panel 3 by the spot welding. As shown in FIG. 3, the bracket 9 is arranged so that the longitudinal axis K—K of the bracket 9 is perpendicular to the longitudinal axis J—J of the roofside rail 1.

Referring again to FIGS. 1, 2A, and 2B, the deformable portion 12 includes standing portions 12a and 12b, extending from the corresponding end portions 10 and 11 toward the compartment 6, and an intermediate portion 12c extending between the standing portions 12a and 12b. Accordingly, the bracket 9 protrudes from the inner panel 3 toward the compartment 6. Note that the intermediate portion 12c extends parallel to the inner panel 3 facing thereto.

The end 7a of the assist grip 7 is connected to the intermediate portion 12c via a bolt 13 and a nut 14. Namely, the bolt 13 extends perpendicular to the intermediate portion 12c and through an aperture 12d formed in the intermediate portion 12c, and is screwed into the nut 14 welded to the intermediate portion 12c. As shown in FIG. 1, the distal end of the bolt 13 and the nut 14 are on the roofside rail-side of the bracket 9. Note that the aperture 12d is positioned so that a length of the deformable portion 12 from the aperture 12d to the end portion 10 and that from the aperture 12d to the end portion 11 are equal to each other, and the deformable portion 12 will therefore deform uniformly.

Further, a spacer 15 of resin is interposed between the end 7a of the assist grip 7 and the intermediate portion 12c. Note that an aperture 12e is for receiving a pin member (not shown) of the spacer 15 for preventing the spacer 15 from rotating about the bolt 13, and the aperture 12d is eccentric to the longitudinal axis K—K of the bracket 9.

A pair of reinforcing members 16a, 16b are integrally formed with the deformable portion 12 of the bracket 9. In the present embodiment, the bracket 9 together with the reinforcing members 16a and 16b is formed by a press process. As shown in FIG. 2A, the reinforcing members 16a and 16b are arranged on the both side edges of the deformable portion 12. In other words, the reinforcing member 16a is on one side of the longitudinal axis K—K of the bracket 9, and the reinforcing member 16b is on the other side of the longitudinal axis K—K. Each reinforcing member 16a, 16b extends from the deformable portion 12 toward the outside of the compartment 6, perpendicular to the deformable portion 12, and extends between its longitudinal ends continuously. Further, the longitudinal ends of each reinforcing member 16a, 16b are spaced apart from the adjacent end portions 10, 11 of the bracket 9.

As shown in FIG. 1, the inner panel 3 facing to the deformable portion 12 includes a depression 17 depressing toward the outside of the compartment 6 or outwardly. The deformable portion 12 and the outward depression 17 provide a clearance S between the bracket 9 and the inner panel 3. Further, the depression 17 includes an opening 18 facing the distal end of the bolt 13 and the nut 14. The opening 18 has a dimension large enough for the bolt 13 and the nut 14 to be displaced through the opening 18, and small enough not to decrease the rigidity of the roofside rail 1.

Note that the bracket 9 has a thickness of 0.9 mm and the clearance S is 20 mm in the present embodiment. Alternatively, the bracket 9 may have a thickness of 0.4 to 1.2 mm, and the clearance S may be 10 to 30 mm.

Next, the operation of the energy absorbing structure shown in FIG. 1 will be explained.

When an outward load larger than a predetermined load acts on the assist grip 7, the deformable portion 12 of the bracket 9 deforms toward the outside, to thereby provide the energy absorption. Namely, first, the standing portions 12a and 12b without the reinforcing members 16a and 16b deform, mainly by buckling, and then, the standing portions 12a and 12b with the reinforcing members 16a and 16b deform, mainly by buckling. Then, the reinforcing members 16a and 16b abut the inner panel 3, and then deform mainly by bending. Finally, the intermediate portion 12c abuts the inner panel 3. In this way, energy absorption is provided.

During the depression of the deformable portion 12, the distal end of the bolt 13 and the nut 14 displace through the opening 17 in the inner panel 3 and into the inner space 4 of the roofside rail 1, to thereby prevent the displacement of the bolt 13 and the nut 14 being limited by the inner panel 3. This enlarges the allowable displacement of the intermediate portion 12c, i.e., the clearance S. Further, as mentioned above, the deformable portion 12 protrudes toward the compartment 6 and the inner panel 3 includes the outward depression 17. This also increases the clearance S. As the clearance S becomes larger, the absorbable energy becomes larger. Thus, a large amount of energy can be absorbed in the present embodiment.

Furthermore, the reinforcing members 16a and 16b deform after abutting the inner panel 3, as mentioned above. This also provides a large energy absorption.

On the other hand, the reinforcing members 16a and 16b provide the deformable portion 12 with a resistance against an inward bend or twist, and enhance the tensile strength of the deformable portion 12 with respect to the inward tensile load. Thus, when an inward load acts on the assist grip 7, the reinforcing members 16a and 16b suppress the deformation of the deformable portion 12. Accordingly, the assist grip 7 is firmly supported by the bracket 9 in normal use.

In the present embodiment, the bracket 9 is attached to the roofside rail 1 outside the inner space 4. Thus, the energy absorbing structure can be applied to the conventional roofside rail, without any modification to the roofside rail.

Figure 4:
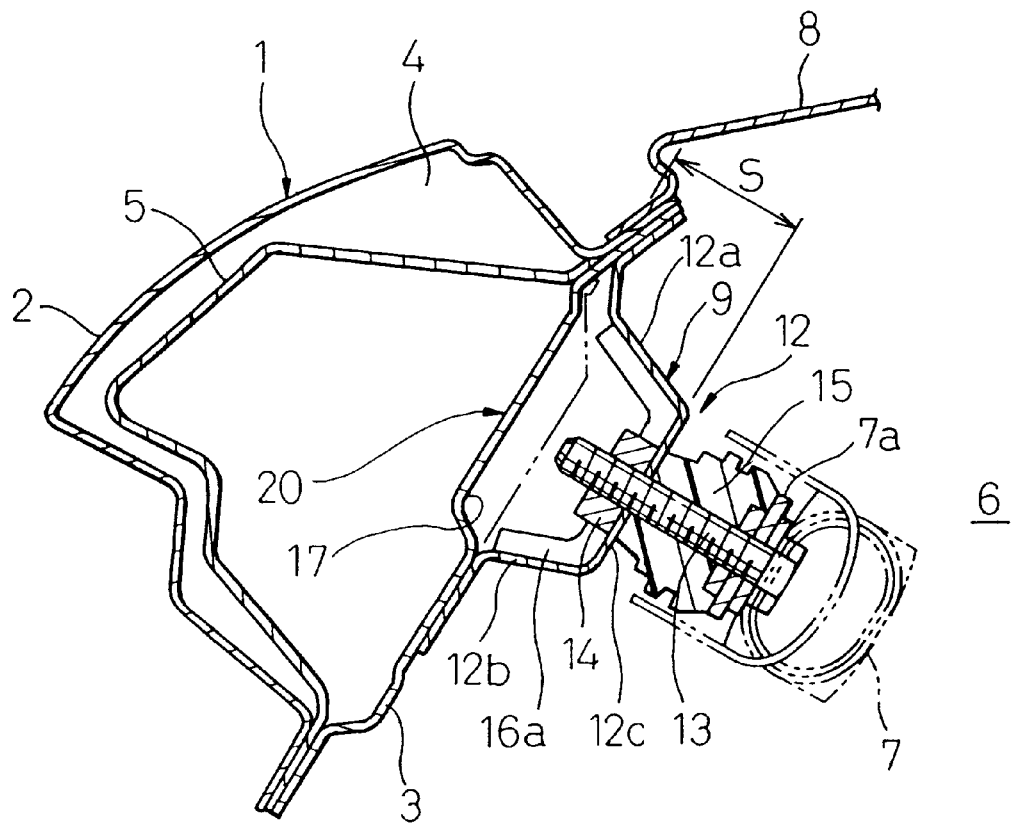
FIG. 4 is a vertical cross sectional view of the roofside rail with the assist grip and the bracket, according to another embodiment of the present invention.
Figure 5:
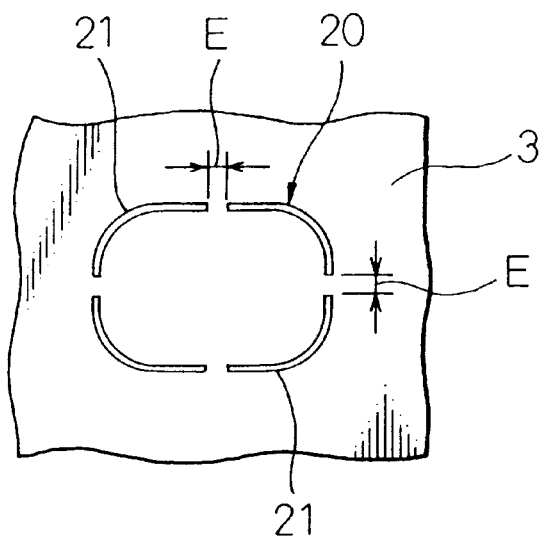
FIG. 5 is a front view of the weakened portion of the inner panel.

FIG. 4 illustrates another embodiment of the present invention.

Referring to FIG. 4, a weakened portion 20 is formed in the inner panel 3 facing to the bolt 3 and the nut 14. This is a difference between the embodiment shown in FIG. 1 and the present embodiment. Namely, the weakened portion 20 comprises a plurality of slits 21, aligned in a form of a ring with gaps therebetween. The gap E between the adjacent slits 21 is set to 2 mm in the present embodiment. Alternatively, the gap E may be set to a few millimeters. The weakened portion 20 may comprise a V-shaped groove in the form of a ring, alternatively.

When an outward load larger than a predetermined load acts on the assist grip 7, the deformable portion 12 deforms toward the outside. Then, the distal end of the bolt 13 abuts the weakened portion 20, and then breaks the weakened portion 20 to thereby form an opening in the inner panel 3, as the opening 18 in FIG. 1. After the opening is formed, the distal end of the bolt 13 and the nut 14 displace through the opening and into the inner space 4 of the roofside rail 1. Accordingly, a larger allowable displacement of the intermediate portion 12c is ensured.

Further, as mentioned above, the bolt 13 abuts with the weakened portion 20, and then breaks the weakened portion 20. This provides a large energy absorption.

In the present embodiment, the opening is not formed in the roofside rail 1 until the bolt 13 breaks the weakened portion 20. Thus, the rigidity of the roofside rail 1 is ensured, and it is prevented that the outside noise travels through the opening in the roofside rail into the compartment 6, as long as the weakened portion 20 is kept unbroken.

Note that the other structures and the operation of the energy absorbing structure of the present embodiment are same as those of the above-mentioned embodiment, and thus explanations thereof are omitted.

Figure 6:
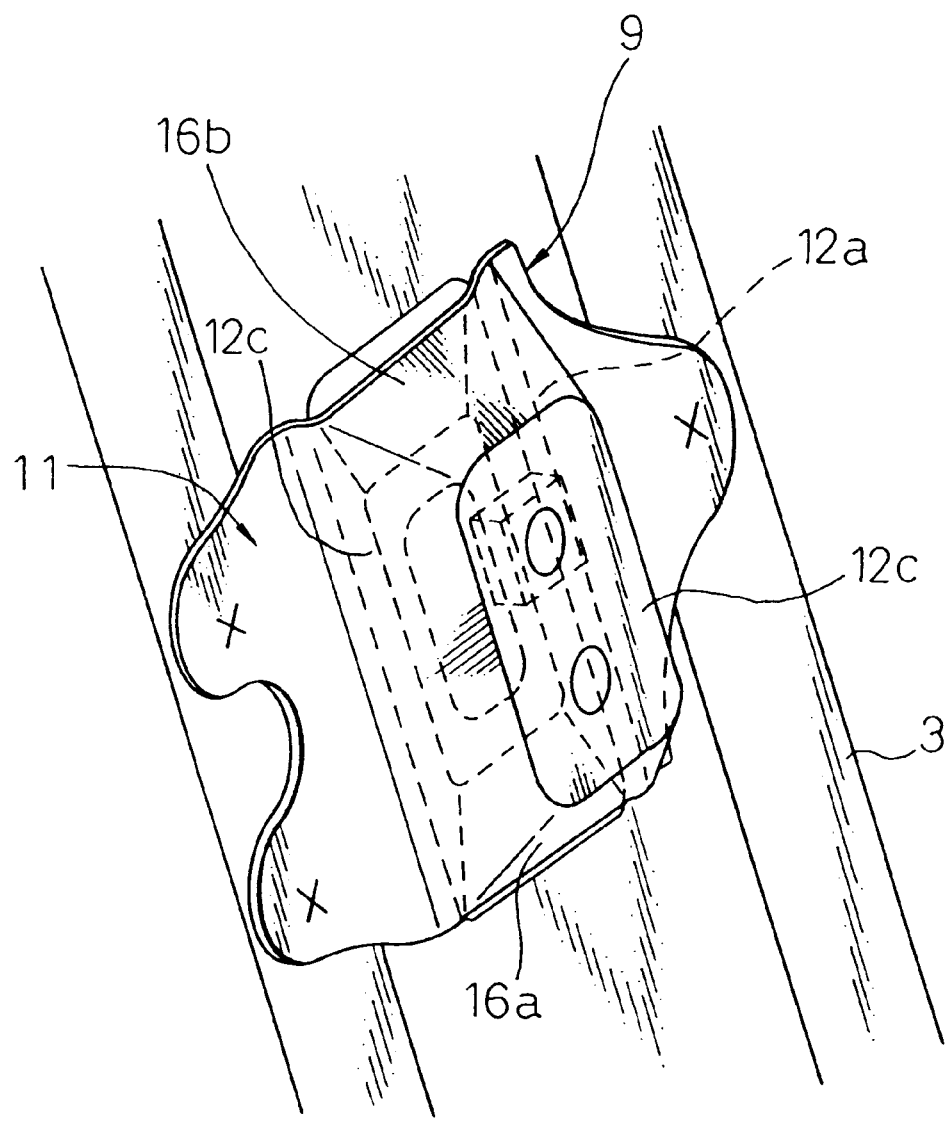
FIG. 6 is a perspective view illustrating the bracket connected to the inner panel, according to another embodiment of the present invention.

FIG. 6 illustrates further another embodiment of the present invention.

In this embodiment, the reinforcing members 16*a* and 16*b* extend continuously between the standing portions 12*a* and 12*b*, respectively. As a result, the standing portions 12*a* and 12*b* and the reinforcing members 16*a* and 16*b* are arranged in the form of a cylinder around the intermediate portion 12*c*, as shown in FIG. 6. In the present embodiment, the bracket 9 together with the reinforcing members 16*a* and 16*b* is formed by a contraction process.

When an outward load larger than a predetermined load acts on the assist grip 7, the standing portions 12*a* and 12*b* and the reinforcing members 16*a* and 16*b* deform mainly by buckling. Thus, a large energy absorption is provided.

On the other hand, the reinforcing members 16*a* and 16*b* connect the standing portions 12*a* and 12*b* to each other. This enhances the strength of the deformable portion 12, and suppress the inward deformation of the bracket 9 sufficiently. Accordingly, the assist grip 7 is firmly supported by the bracket 9, when the inward load acts on the assist grip 7.

Note that, if the clearance S is 20 mm or more, the opening 18 or the weakened portion 20 is unnecessary.

Note that the other structures and the operation of the energy absorbing structure of the present embodiment are same as those of the above-mentioned embodiment, and thus explanations thereof are omitted.

Figure 7:
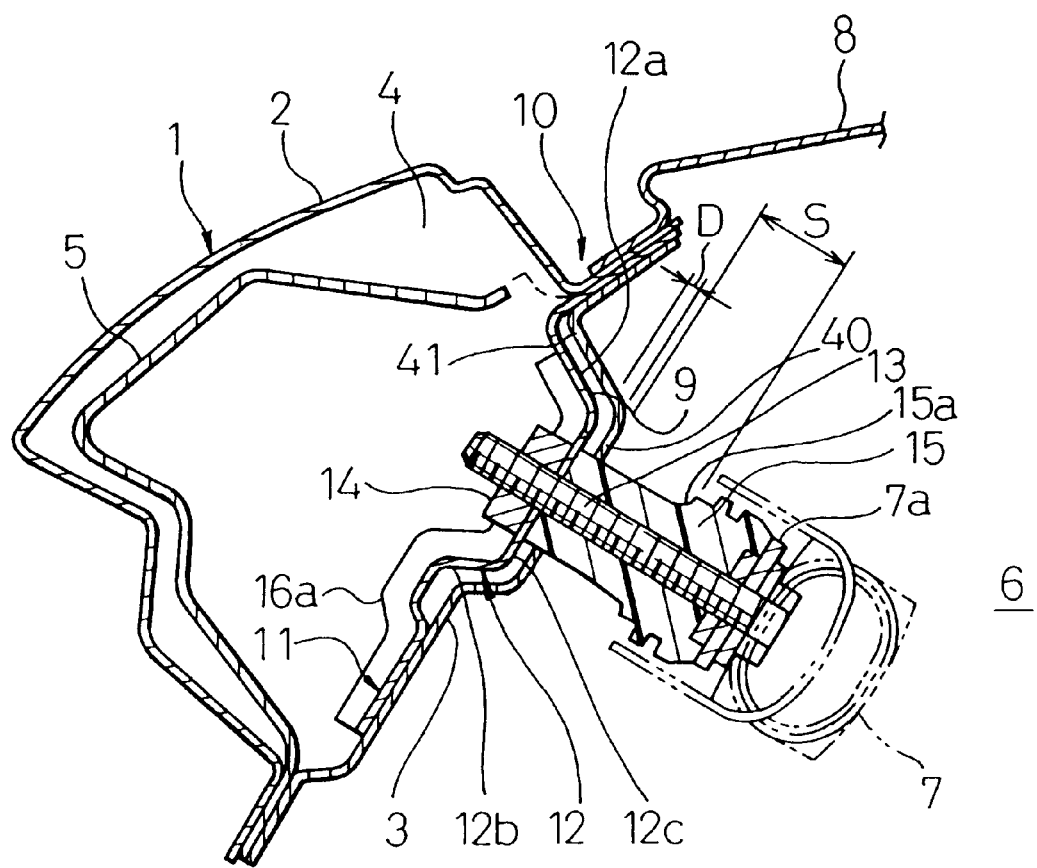
FIG. 7 is a vertical cross sectional view of the roofside rail with the assist grip and the bracket, according to another embodiment of the present invention.

FIG. 7 illustrates another embodiment of the present invention.

Referring to FIG. 7, the bracket 9 is connected to the inner panel 3 on the outer side thereof, i.e. within the inner space 4 of the roofside rail 1. An opening 40 is formed in the inner panel 3, through which the bolt 13 and the spacer 15 extend. Thus, the assist grip 7 is connected to the bracket 9.

As shown in FIGS. 7 and 9, the inner panel 3 facing the deformable portion 12 includes a depression 41 depressed toward the compartment 6 or inwardly. The deformable portion 12 protrudes toward the compartment 6, and is accommodated within the inward depression 41. There is formed a clearance D between the deformable portion 12 and the inward depression 41.

While the deformable portion 12 and the inner panel 3 may contact each other, it is preferable that they are spaced apart from each other. This is because the clearance D prevents an undesirable contacting noise. The clearance D is set to 2 mm in the present embodiment. Alternatively, the clearance D may be set to a few millimeters.

Next, the operation of the energy absorbing structure shown in FIG. 7 will be explained.

When an outward load larger than a predetermined load acts on the assist grip 7, first, the standing portions 12*a* and 12*b* without the reinforcing members 16*a* and 16*b* deform, mainly by buckling and, then, the standing portions 12*a* and 12*b* with the reinforcing members 16*a* and 16*b* deform, mainly by buckling. Finally, the deformable portion 12 protrudes toward the outside. In this way, energy absorption is provided.

During the depression of the deformable portion 12, the spacer 15 displaces through the opening 40 in the inner panel 3, until a shoulder 15*a* formed in the spacer 15 abuts with the inner panel 3. Namely, the displacement of the deformable portion 12 is limited by the shoulder 15*a*. Thus, the distance S between the inner panel 3 and the shoulder 15*a* is an allowable displacement of the intermediate portion 12*c*. The distance S is 13 mm in the present embodiment. Alternatively, the distance S may be 10 to 30 mm.

On the other hand, when an inward load acts on the assist grip 7, the reinforcing members 16*a* and 16*b* suppress the deformation of the deformable portion 12. Accordingly, the assist grip 7 is firmly supported by the bracket 9 in the normal use.

Note that the other structures and the operation of the energy absorbing structure of the present embodiment are same as those of the above-mentioned embodiment, and thus explanations thereof are omitted.

Figure 10A:
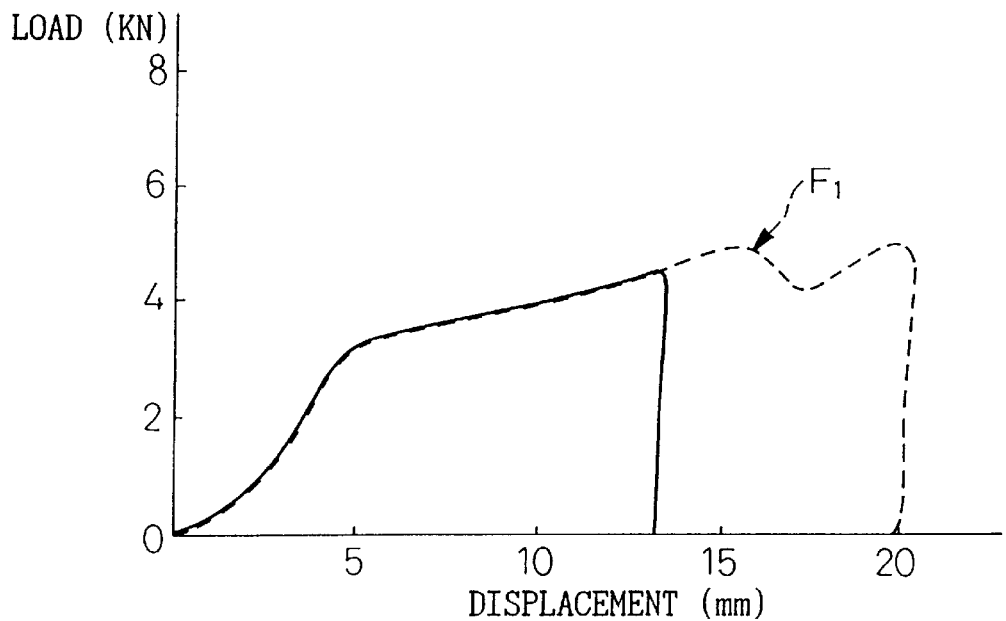
FIGS. 10A and 10B are diagrams illustrating relationships between the load and the displacement.
Figure 10B:
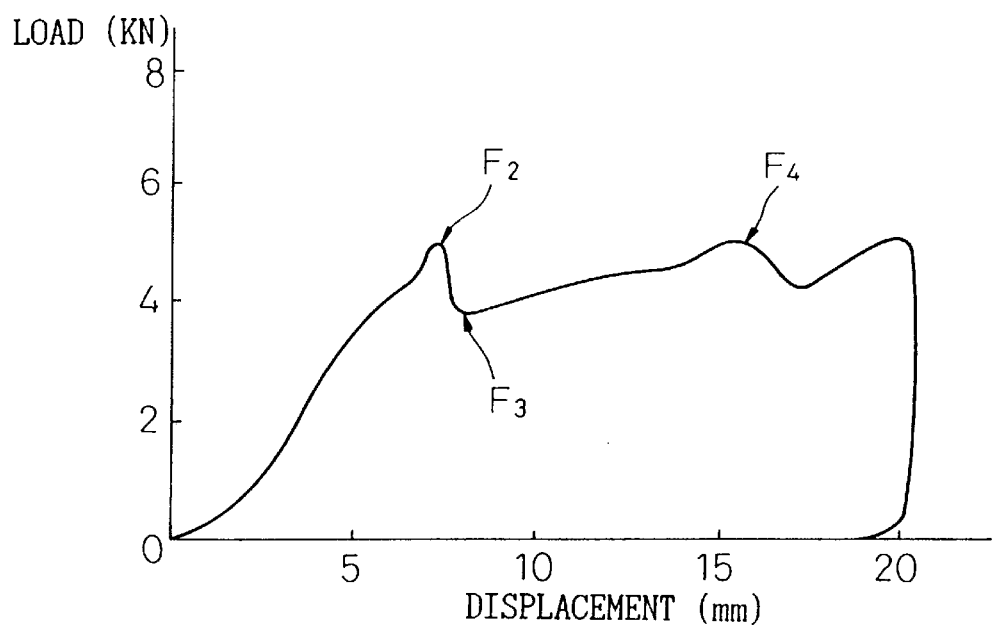

FIGS. 10A and 10B illustrate the relationships between the load and the displacement of the deformable portion 12 of the bracket 9, in the above-mentioned embodiments. The broken line in FIG. 10A illustrates the relationship in the embodiment shown in FIG. 1, and the solid line in FIG. 10A illustrates the relationship in the embodiment shown in FIG. 7. FIG. 10B illustrates the relationship in the embodiment shown in FIG. 4.

In the embodiment shown in FIG. 1, the load increases as the displacement increases, and the peak value is obtained as shown by an arrow F1. This is due to the abutment of the reinforcing members 16*a* and 16*b* with the inner panel 3 and the deformation of the reinforcing members 16*a* and 16*b*. In the embodiment shown in FIG. 4, the load increases as the displacement increases, and the peak value is obtained as shown by an arrow F2. This is due to the abutment of the distal end of the bolt 13 with the weakened portion 20 and the break of the weakened portion 20. When the weakened portion 20 is almost torn, the load increases again, as shown by an arrow F3. Then, the peak value is obtained as shown by an arrow F4. This is due to the abutment of the reinforcing members 16*a* and 16*b* with the inner panel 3 and the deformation of the reinforcing members 16*a* and 16*b*. In the embodiment shown in FIG. 7, the load increases as the displacement increases, as in the embodiment shown in FIG. 1. However, a peak value is not obtained.

The area enclosed by the curve and the X-axis in FIGS. 10A and 10B represents the absorbed energy. The load must be kept lower, and thus the allowable displacement or the initial slope of the curve of the load-displacement relationships is required to be large to increase the absorbable energy.

In the embodiments mentioned above, the allowable displacement is made larger by the inwardly protruding bracket 9. Further, in the embodiments shown in FIGS. 1 and 4, the depression 17 in the inner panel 3 enlarges the allowable displacement. On the other hand, the bracket 9 of metal makes the initial slope of the curve larger. Further, the reinforcing members 16*a* and 16*b*, especially those shown in FIG. 6, also make the initial slope of the curve larger. Accordingly, an increased absorbable energy is obtained according to the present invention.

In the above embodiments, there are provided the reinforcing members 16*a* and 16*b* which extend from the bracket toward the outside of the compartment 6. Alternatively, reinforcing members 16a and 16b which extend from the bracket toward the compartment 6, or toward both sides may be provided.

According to the present invention, it is possible to provide an energy absorbing structure for an automobile capable of supporting the assist grip firmly, while providing energy absorption for an outward load on the assist grip.

While the invention has been described by reference to specific embodiments chosen for purposes of illustration, it should be apparent that numerous modifications could be made thereto by those skilled in the art without departing from the basic concept and scope of the invention.

We claim:

1. An energy absorbing structure for an automobile having a passenger compartment, a roofside rail with a closed section and an inner space, the roofside rail having a side facing the compartment, and an assist grip connected to the compartment side of the roofside rail, the energy absorbing structure comprising:

a bracket interposed between the roofside rail and the assist grip, the bracket having longitudinal end portions fixed to the roofside rail, and a deformable portion extending between the end portions, to which the assist grip is connected, the deformable portion deforming toward the outside of the compartment to provide the energy absorption when an outward load larger than a predetermined load acts on the assist grip; and at least one reinforcing member formed integrally with the deformable portion of the bracket and extending along the longitudinal axis of the bracket.

2. An energy absorbing structure according to claim 1, wherein a pair of reinforcing members are formed with the deformable portion of the bracket, one being arranged on one side of the longitudinal axis of the bracket, and the other being arranged on the other side of the longitudinal axis of the bracket.

3. An energy absorbing structure according to claim 2, wherein the reinforcing members are arranged on both side edges of the deformable portion of the bracket.

4. An energy absorbing structure according to claim 1, wherein the reinforcing member extends continuously between the longitudinal ends thereof, and wherein the longitudinal ends of the reinforcing member are spaced apart from the adjacent end portions of the bracket, respectively.

5. An energy absorbing structure according to claim 1, wherein the reinforcing member extends from the deformable portion of the bracket toward the outside of the compartment.

6. An energy absorbing structure according to claim 1, wherein the deformable portion of the bracket protrudes toward the compartment.

7. An energy absorbing structure according to claim 6, wherein the deformable portion of the bracket comprises standing portions extending from the end portions of the bracket toward the compartment, and an intermediate portion extending between the standing portions, and wherein the assist grip is connected to the intermediate portion.

8. An energy absorbing structure according to claim 7, wherein the intermediate portion of the bracket and a portion of the roofside rail facing to the bracket are substantially parallel to each other.

9. An energy absorbing structure according to claim 7, wherein a pair of the reinforcing members are formed with the bracket and extend between the standing portions of the bracket so as that the standing portions and the reinforcing members are arranged in the form of a cylinder around the intermediate portion of the bracket.

10. An energy absorbing structure according to claim 1, wherein the bracket is connected to the compartment side of the roofside rail.

11. An energy absorbing structure according to claim 10, wherein an attachment for connecting the assist grip to the bracket extends from the assist grip through the bracket toward the roofside rail, and wherein the roofside rail includes an opening facing to the attachment so that, when the bracket deforms toward the outside of the compartment, the attachment displaces through the opening.

12. An energy absorbing structure according to claim 10, wherein an attachment for connecting the assist grip to the bracket extends from the assist grip through the bracket toward the roofside rail, and wherein the roofside rail includes a weakened portion facing the attachment so that, when the bracket deforms toward the outside of the compartment, the attachment breaks the weakened portion to form an opening on the roofside rail, and is displaced through the opening.

13. An energy absorbing structure according to claim 10, wherein the roofside rail comprises an outward depression facing to the bracket.

14. An energy absorbing structure according to claim 1, wherein the bracket is connected to roofside rail within the inner space thereof.

15. An energy absorbing structure according to claim 14, wherein the roofside rail comprises an inward depression facing the bracket.

16. An energy absorbing structure according to claim 1, wherein the deformable portion of the bracket is spaced apart from the roofside rail.

17. An energy absorbing structure according to claim 1, wherein the longitudinal axis of the bracket is substantially perpendicular to the longitudinal axis of the roofside rail.

18. An energy absorbing structure according to claim 1, wherein an attachment for connecting the assist grip to the bracket is substantially perpendicular to the deformable portion of the bracket.

19. An energy absorbing structure according to claim 1, wherein the bracket is formed of a metal plate.

20. An energy absorbing structure according to claim 1, wherein the roofside rail comprises an outer half and an inner half connected to each other, the inner half being arranged in the compartment, and wherein the bracket is connected to the inner half.

* * * * *